United States Patent [19]

Ward

[11] Patent Number: 4,957,163

[45] Date of Patent: Sep. 18, 1990

[54] METHOD OF STABILIZING POLYMER SOLUTIONS IN A SUBTERRANEAN FORMATION

[75] Inventor: Mark B. Ward, Missouri City, Tex.

[73] Assignee: Texaco Inc., White Plains, N.Y.

[21] Appl. No.: 461,942

[22] Filed: Jan. 8, 1990

[51] Int. Cl.$^5$ .............................................. E21B 43/22
[52] U.S. Cl. .................................... 166/273; 166/275; 252/8.554
[58] Field of Search ............ 166/273, 274, 275, 305.1; 252/8.554

[56] References Cited

U.S. PATENT DOCUMENTS

| | | | |
|---|---|---|---|
| 3,892,275 | 7/1975 | Lybarger et al. | 166/307 X |
| 4,325,433 | 4/1982 | Yen et al. | 166/274 X |
| 4,493,370 | 1/1985 | Stapp et al. | 166/274 X |
| 4,542,789 | 9/1985 | Stapp | 166/274 |
| 4,572,296 | 2/1986 | Watkins | 166/303 |

*Primary Examiner*—George A. Suchfield
*Attorney, Agent, or Firm*—Jack H. Park; Kenneth R. Priem; Harold J. Delhommer

[57] ABSTRACT

Petroleum is extracted from a subterranean reservoir by injecting into injection wells an aqueous polymer solution wherein the polymer is stabilized against viscosity deterioration by treating the reservoir with an effective amount of urea in an aqueous solution.

13 Claims, No Drawings

METHOD OF STABILIZING POLYMER SOLUTIONS IN A SUBTERRANEAN FORMATION

BACKGROUND OF THE INVENTION

1. Field of the Invention

This invention relates to enhanced oil recovery processes, whereby aqueous polymer solutions are used to drive oil to a producing well. Stabilization of the viscosity of the polymer solutions is a problem which has plagued such flooding efforts. This invention relates to such stabilization efforts.

2. Description of Related Art

Crude oils are accumulated into geologic traps in the earth, wherein the pores of the rock contain crude oil and connate water. Wells drilled into the geologic traps recover the crude oil by a variety of processes. In what are called "primary" production processes, oil flows to the wellhead at the surface driven by natural pressure or the oil is lifted to the surface by artificial means, such as pumps. In "secondary" production processes, fluids are injected into the oil reservoir through some wells to increase pressure in the oil reservoir or to assist in driving or displacing oil to wells where it can be produced to the surface through other wells. At times, even after a secondary process has been practiced, a "tertiary" recovery process will be employed by further injection of a fluid to increase the amount of oil produced. The fluid injected in either a secondary or tertiary process is often water, aqueous solutions or steam. The crude oils produced vary from oils with a viscosity less than water to oils that are very viscous, even tar-like at ambient temperatures.

Even if the oil is low in viscosity, this process of water displacement of oil leaves large quantities of oil trapped by capillary forces in the pores of the rock. It is well-known in the art to add chemicals such as surface active materials to the water that is injected into oil reservoirs to decrease the capillary forces and to allow more of the oil to be produced. When surface active chemicals are used, there is often a need to drive the chemicals through the reservoir with a following water solution that is made more viscous by the presence of polymers. The polymer solution, or polymer bank as it is often called, is also driven by a fluid, often brine from the very reservoir being produced. It is known in the art that a greater volume of oil-containing rock is contacted by the chemical solutions when they are driven by more viscous driving fluids and, thereby, larger amounts of oil are recovered. A problem arises in many instances, however, because the viscosity of the polymer solution degrades during the time it is in contact with the reservoir rock, particularly rock having acidic sites which react with the polymers. The problem increases in severity as the natural temperature of the reservoir increases.

In oil reservoirs where the crude oil present is highly viscous in its natural state, when water is injected to drive the crude oil to producing wells, the water tends to channel through the viscous oil and leave a large volume of the oil in the rock. Water production will often reach uneconomic amounts before a significant amount of the viscous oil is displaced. Three approaches to increasing the amount of viscous oil produced are well-known in the art: (1) decreasing the viscosity cf the oil by heating it, (2) increasing the viscosity of the water by adding polymers to it, or (3) using a combination of (1) and (2). When the oil in a reservoir is heated, for example, by injection of steam, it is known in the art that injection of viscous water solutions following the steam will often produce additional oil. The reservoir temperature is higher after steam injection and thus the aqueous solutions of polymers are exposed to abnormally high temperatures. The higher temperatures cause the polymers to degrade more rapidly. There is a critical need for methods to allow the polymers employed to maintain their structure and move through the rock, particularly acid rock, with the injected water, so that their benefits are realized in displacing more of the crude oil in the reservoir.

Several types of water-soluble polymers are known in the art to increase the viscosity of aqueous solutions and are used to drive chemicals through a reservoir or to displace viscous oils from a reservoir. Many water-soluble polymers are extremely expensive, which makes their use in a reservoir to recover oil prohibitive unless the price of crude oil at the wellhead is also very high. Attempts to use less expensive water-soluble polymers are thwarted by the problem of rapid degradation of the polymers in the oil reservoir due to contact with the formation rock, with the resultant loss of viscosity. This is particularly true in the reservoir in the Kern River Field in California.

Some of the desirable and relatively inexpensive water-soluble polymers include polyacrylamides, polyacrylates and polymers which are produced by living organisms, called biopolymers, such as polysaccharides, particularly xanthum gum and scleroglucan. Even though effective for a short time, the viscosity of these solutions diminishes and the solutions become ineffective when in contact with reservoir rock for periods of time necessary for their use. Efforts to stabilize them have been wanting. Various attempts have been made to treat reservoir rock so that the viscosity of polymers will not be degraded at high temperatures. Particularly, sodium carbonate or sodium hydroxide have been used, but they have not been proven economically effective. It is an advantage of this invention that a cheap material, urea, will, at relatively low concentrations, tend to neutralize the acidity in the rock and reduce the degradation of polymers in the reservoir.

SUMMARY OF THE INVENTION

It is an advantage of this invention that inexpensive polymer materials may be used for polymer floods in tertiary oil production by pretreating the rock in the formation with an aqueous solution of urea.

The method of this invention is practiced by injecting into a petroleum-bearing reservoir an aqueous solution of urea, either immediately before a polymer recovery solution is injected, along with the polymer solution, or both. The result of introducing urea into an oil reservoir is to stabilize the polymer solution against loss of viscosity. The mechanism by which the urea accomplishes this result is not known completely, but it is believed related to a neutralization of acidic sites on the surface of the rock by the urea. The solution will contain an effective amount of urea, generally from about 0.1 to about 2% by weight. Urea is a widely available, inexpensive chemical and its use in the practice of this invention allows the less expensive polymers to be used in the polymer flood.

DESCRIPTION OF THE PREFERRED EMBODIMENTS

In the practice of this invention in accomplishing secondary or tertiary recovery of oil from oil-bearing reservoirs, the reservoir is normally penetrated by injection wells and producing wells in fluid communication through such reservoir. The reservoirs have often been depleted somewhat through the primary production techniques well known to those skilled in the art. Certain formations made up of acidic rock such as sandstone, make tertiary recovery through polymer floods difficult, since such acidic sites on the rock tend to degrade the polymers introduced into the flood liquid, normally a brine, causing the viscosity to become reduced as the polymer itself degrades. The degradation due to the presence of the acidic sites in the rock is even more prevalent with less expensive (more diverse mixtures) of polymers such as, for example, polyacrylamides, polyacrylates or polysaccharides.

I have discovered that a urea solution containing an amount of urea effective for at least partially neutralizing such acidic sites on the rock in the formation improves the stability of the viscosity of the aqueous polymer solution being used to drive the oil to the producing wells.

An effective amount of urea can easily be determined in laboratory experiments using tubes packed with a representative reservoir sand. In any case, the amount is generally from 0.1 to about 2 wt % urea in a brine or aqueous solution. Greater amounts can be used but normally such would not be necessary, and would only waste urea. Preferred amounts are from 0.75 wt % to about 1.5 wt % urea in the aqueous brine solution. For example, a 1 wt % urea solution has been found to result in a pH of 8.2 in a natural brine from the Kern River Field.

As is normally the case in secondary and tertiary recovery, surfactants are often used to treat the formation at one stage in the recovery and the practice of this invention is such that the urea can be incorporated into the surfactant solution itself. The urea can also be used as a flood solution prior to the insertion of the polymer bank into the formation, or, in fact, it can be incorporated into the first part of the polymer bank being pumped into the reservoir for the production of the oil.

In the practice of this invention from almost 15% to about 50% of pore volume of the urea solution is injected. It is preferred to introduce into the formation a volume of urea solution equal to from about 20% to 40% of the pore volume of the rock in the reservoir. The urea solution contains an effective amount of the urea, as stated above, for the neutralization of the acid sites on the rock in order to inhibit degradation of the polymers which will follow the solution. When used with the polymer solution itself, a portion, say 15% to about 25% pore volume, can be introduced into the formation ahead of the polymer solution in a brine solution in order to pretreat the rock and to move ahead of the polymer bank. About 5% to 15% pore volume of the first part of the polymer solution would then contain the remaining amount of urea.

In following the pre-flush or pre-treatment of the rock or the formation using the urea solution, the well-known amounts and methods of polymer flooding with an aqueous polymer drive solution are used.

The practice of this invention works particularly well in connection with oil recovery from the Kern River sand, which includes enormous quantities of viscous petroleum. The pre-flush with the urea solution at a 1 wt % concentration of urea has been found to result in a pH of about 8.2 in Kern River produced brine. Thus, this solution neutralizes acidic sites on rock and, when followed by a polymer injection, the flood results in stabilized viscosity and increased oil recovery through a producing well.

The above-described invention is further shown by the following examples which are presented to demonstrate the applicability of the invention and should not be considered as limiting on said claimed invention.

EXAMPLE 1 (COMPARATIVE)

A laboratory experiment illustrates the lack of stability of polymers in a simulated reservoir rock. A sample of unconsolidated rock from the Kern River Field of California was packed into a tube and the system brought to a temperature of 120° C. About 4 or 5 pore volumes of de-oxygenated, 2.5% sodium chloride in Kern River produced brine, degassed under nitrogen to about 2 ppb oxygen, was put through the tube to condition the sand. Then an aqueous solution of 1500 ppm of a polyacrylamide (Cyanotrol 740, American Cyanamid Company), was flowed through the sand-pack. Effluent viscosities of polymer solution were measured as a function of pore volumes injected. The effluent viscosity reached only 80% of injected viscosity after 3 pore volumes of polymer solution had been injected. After polymer solution had been left in the packed tube for three days, maintaining the temperature at 120° C., a sample was displaced and its viscosity had decreased to only about 20% of its injected value. These flow tests revealed that the polymer had degraded significantly in only three days. This amount of degradation would render a polymer solution useless in increasing oil recovery from a reservoir.

EXAMPLE 2

A tube packed with Kern River sand was prepared as described in Example 1. The sand was then flushed with a solution of 1% urea in the de-oxygenated brine. Then a solution of 1500 ppm Cyanotrol 740 was injected and the viscosity of the effluent solution was monitored. After only 2.5 pore volumes of polymer solution injection, the viscosity had reached about 95% of the injected viscosity. At this time, the flow was stopped and the polymer solution allowed to remain in the packed tube at 120° C. for 3 days. Then the solution was displaced and its viscosity determined. The viscosity remained at about 95% of injected viscosity, showing little or no degradation over this time at high temperature and in contact with the rock.

Table 1 compares the results of this experiment to the experiment when no urea flush was used ahead of polymer injection.

TABLE 1

| Effect of Urea Pre-Flush on Viscosity Degradation of Polymer 120° C. - Cyanotrol 740 Polyacrylamide - 1500 ppm | | |
|---|---|---|
| | Pore Volumes Injected | % Injected Viscosity |
| | | Initial | After 3 days |
| Without Urea Pre-flush | 3.0 | 80 | 20 |
| With Urea Pre-flush | 2.5 | 95 | 95 |

The stabilizing effect of the urea pre-flush is very significant and surprising.

EXAMPLE 3

In an oil reservoir containing highly viscous oil, steam is first injected to heat the reservoir and lower the viscosity of the oil. Steam is injected until breakthrough of heated water occurs in some of the production wells. At this point average oil content of the reservoir has been reduced from 70% pore volume of the productive rock to 60% pore volume. Then a water solution of urea is injected at a concentration of 1 wt % in the brine used for water flooding the reservoir. Tests are performed in the laboratory using samples of rock from the reservoir, which tests are known by one skilled in the art, to determine the total amount of urea effective to treat the reservoir rock so that it does not rapidly degrade the polymer. After these tests, it is determined that a 1 wt % urea solution in an amount equal to 20% of the total pore volume of the rock between injection and production wells is injected. Following injection of the urea solution, a solution of 1500 ppm of the polyacrylamide polymer (Cyanatrol 740), is injected as a polymer flood. The polymer solution is effective in driving additional oil to the production wells.

EXAMPLE 4

In another area of the same reservoir as described in Example 3, it is desired that the water injection phase be reduced below 20% of pore volume. To supply urea to the reservoir and stabilize the polymer, 10% pore volume of 1 wt % urea solution in brine is injected before polymer injection is begun, and 1 wt % urea is added to the first 10% pore volume of polymer solution injected. The same benefits from the urea are realized, since the urea ahead of the polymer injection conditions the rock for the first part of the bank of polymer solution injected and the additional urea added to the polymer solution conditions the rock for the last part of the polymer bank.

EXAMPLE 5

In an oil reservoir containing low viscosity oil, a water flood reduces average oil content of the reservoir from 70% of the pore volume of productive rock to 50% of the pore volume of the productive rock. Then a volume of a solution of surface active chemical in water is injected to reduce capillary forces trapping oil in the rock. The 1 wt % urea solution is then added to the last 20% pore volume of the solution containing the surface active chemical. Immediately following the injection of surface active chemical and urea, a volume equal to 50% pore volume of a solution of 1500 ppm polyacrylamide (Cyanatrol 740) is injected. Then brine produced from wells in the field is injected following the polymer solution. The polymer solution increases the amount of rock contacted by the surface active chemical and is effective in increasing the amount of oil recovered from the reservoir. The urea injected in the solution ahead of the polymer prevents degradation of the polymer solution as it moves through the reservoir at natural reservoir temperature.

The methods of the present invention and its advantages will be understood from the foregoing description and it will be apparent that many changes may be made in the procedures thereof without departing from the spirit and scope of the invention, the forms hereinbefore described being merely preferred or exemplary embodiments.

What is claimed is:

1. A process for recovering petroleum from an underground reservoir having acidic sites wherein the reservoir is penetrated by at least one injection well and at least one production well, said wells being in fluid communication with each other, comprising:
   a. injecting through the injection well into the reservoir an effective amount of an aqueous solution of urea to neutralize the acidic sites on rock in the reservoir.
   b. injecting into the reservoir an amount of an aqueous solution of a water-soluble polymer as an oil drive fluid,
   c. forcing the urea and polymer solutions through the reservoir to drive the petroleum toward the production well, and
   d. recovering petroleum from the reservoir through the production well.

2. The process of claim 1, wherein the effective volume of the urea solution is from about 15% to about 50% of the pore volume of the reservoir.

3. The process of claim 1 wherein the effective concentration of the urea is from about 0.1 to 2.0% by weight of the aqueous solution.

4. The process of claim 3 wherein the aqueous solution of urea contains from 0.5 to about 1.5% by weight urea.

5. The process of claim 1 wherein the aqueous polymer solution is comprised of a water-soluble polyacrylamide.

6. The process of claim 1 wherein the aqueous polymer solution is comprised of a water-soluble polyacrylate.

7. The process of claim 1 wherein the aqueous polymer solution is comprised of a water-soluble biopolymer.

8. The process of claim 1 wherein the injection of the urea solution to treat the acidic sites is completed prior to injection of the aqueous solution of water-soluble polymer.

9. The process of claim 1 wherein at least a portion of the urea is injected in the water-soluble polymer solution.

10. The process of claim 9 wherein the first 10% to 20% of pore volume of water-soluble polymer solution includes about 0.75 wt % to about 1.5 wt %, based upon the water of urea.

11. The process of claim 10 wherein the polymer is polyacrylamide.

12. The process of claim 10 wherein the polymer is polyacrylate.

13. The process of claim 10 wherein the polymer is biopolymer.

* * * * *